(12) United States Patent
Kim et al.

(10) Patent No.: US 11,454,427 B2
(45) Date of Patent: Sep. 27, 2022

(54) AIR CONDITIONER

(71) Applicant: Samsung Electronics Co., Ltd., Suwon-si (KR)

(72) Inventors: Munsub Kim, Suwon-si (KR); Jaewoo Choi, Suwon-si (KR); Hyeongjoon Seo, Suwon-si (KR); Duhan Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 16/537,453

(22) Filed: Aug. 9, 2019

(65) Prior Publication Data

US 2020/0049391 A1 Feb. 13, 2020

(30) Foreign Application Priority Data

Aug. 13, 2018 (KR) .................. 10-2018-0094635

(51) Int. Cl.
*F25B 13/00* (2006.01)
*F25B 41/40* (2021.01)
(Continued)

(52) U.S. Cl.
CPC ............ *F25B 13/00* (2013.01); *F16L 55/033* (2013.01); *F25B 39/02* (2013.01); *F25B 41/40* (2021.01);
(Continued)

(58) Field of Classification Search
CPC .......... F25B 41/30; F25B 41/31; F25B 41/37; F25B 41/38; F25B 2341/06;
(Continued)

(56) References Cited

U.S. PATENT DOCUMENTS 5,214,939 A * 6/1993 Drucker ................. F25B 41/30
62/527
6,199,399 B1 * 3/2001 Voorhis ................. F25B 41/31
62/324.6
(Continued)

FOREIGN PATENT DOCUMENTS

CN 1938553 A 3/2007
CN 101294646 A 10/2008
(Continued)

OTHER PUBLICATIONS

Liu Translation (Year: 2014).*
(Continued)

*Primary Examiner* — Cassey D Bauer

(57) ABSTRACT

An air conditioner includes an outdoor heat exchanger configured to exchange heat between a refrigerant and outdoor air; an indoor heat exchanger configured to exchange heat between the refrigerant and indoor air; a first pipe configured to provide a channel for the refrigerant flowing out of the outdoor heat exchanger and having a first inner diameter; a second pipe configured to provide a channel for the refrigerant flowing into the indoor heat exchanger; a coupling member configured to couple end portions of the first pipe and the second pipe; and a first insertion pipe inserted in the second pipe at the end portion of the second pipe and having a second inner diameter smaller than the first inner diameter of the first pipe.

13 Claims, 16 Drawing Sheets

(51) Int. Cl.
*F16L 55/033* (2006.01)
*F25B 45/00* (2006.01)
*F25B 39/02* (2006.01)

(52) U.S. Cl.
CPC .......... *F25B 45/00* (2013.01); *F25B 2500/12* (2013.01); *F25B 2500/13* (2013.01)

(58) Field of Classification Search
CPC ...................... F25B 2341/062; F25B 2500/12; F25B 41/40; F25B 2500/13; F16L 55/04; F16L 55/041; F16L 55/033; F16L 55/0331
See application file for complete search history.

(56) References Cited

U.S. PATENT DOCUMENTS

| | | | |
|---|---|---|---|
| 9,127,800 | B2 | 9/2015 | Auclair et al. |
| 2004/0003607 | A1* | 1/2004 | Kadle ................. B60H 1/3214 62/158 |
| 2004/0078974 | A1 | 4/2004 | St. James et al. |
| 2007/0204927 | A1* | 9/2007 | Yamashita .............. F16L 55/04 138/26 |
| 2007/0245761 | A1* | 10/2007 | Lee ....................... F25B 43/003 62/296 |
| 2010/0037629 | A1* | 2/2010 | Voorhis ................... F25B 41/30 62/56 |
| 2015/0121950 | A1 | 5/2015 | Chowdhury et al. |
| 2017/0159868 | A1* | 6/2017 | Fisher ............... F16L 55/02718 |
| 2018/0313550 | A1 | 11/2018 | Baetens et al. |

FOREIGN PATENT DOCUMENTS

| | | | |
|---|---|---|---|
| CN | 101446460 | A | 6/2009 |
| CN | 104110538 | A * | 10/2014 |
| CN | 104110538 | A | 10/2014 |
| CN | 204629843 | U | 9/2015 |
| CN | 105157128 | A | 12/2015 |
| CN | 108027150 | A | 5/2018 |
| IT | MI20072110 | A1 | 5/2008 |
| JP | 2000-161817 | A | 6/2000 |
| JP | 2002-061887 | A | 2/2002 |
| KR | 2000-0021141 | A | 4/2000 |
| KR | 10-2002-0015564 | A | 2/2002 |
| KR | 2002-0072347 | A | 9/2002 |
| KR | 2003-0041688 | A | 5/2003 |
| KR | 10-0697675 | B1 | 3/2007 |
| KR | 10-2009-0054490 | A | 6/2009 |
| KR | 10-2012-0080057 | A | 7/2012 |
| KR | 10-2012-0086787 | A | 8/2012 |
| KR | 10-1270207 | B1 | 5/2013 |
| KR | 10-2013-0112797 | A | 10/2013 |
| KR | 10-2015-0051136 | A | 5/2015 |
| WO | 98/36899 | A1 | 8/1998 |

OTHER PUBLICATIONS

International Search Report dated Dec. 6, 2019 in connection with International Patent Application No. PCT/KR2019/009929, 3 pages.
Written Opinion of the International Searching Authority dated Dec. 6, 2019 in connection with International Patent Application No. PCT/KR2019/009929, 5 pages.
Supplementary European Search Report dated Jun. 23, 2021 in connection with European Patent Application No. 19849504, 7 pages.
First Office Action dated Apr. 26, 2022, in connection with Chinese Application No. 201980053277.1, 25 pages.
Korean Intellectual Property Office, "Office Action," dated Jul. 25, 2022, in connection with Korean Patent Application No. 10-2018-0094635, 18 pages.

* cited by examiner

AIR CONDITIONER

CROSS-REFERENCE TO RELATED APPLICATION

This application is based on and claims priority under 35 U.S.C. § 119 to Korean Patent Application No. 10-2018-0094635 filed on Aug. 13, 2018 in the Korean Intellectual Property Office, the disclosure of which is incorporated by reference herein in its entirety.

BACKGROUND

1. Field

The present disclosure relates to an air conditioner controlling various properties of air in a use space in response to a user's request, and more particularly to an air conditioner having a structure for reducing noise in a refrigerant pipe entering an indoor unit.

2. Description of the Related Art

An air conditioner refers to an apparatus provided to control properties such as temperature, humidity, cleanness, air current, etc. in response to a use space. The air conditioner basically includes an air blower forming air current, and changes at least one of properties of air circulated by the air blower, thereby making the environment of the use space comfortable for a user. The air conditioner is classified according to the properties of air to be controlled, and may for example include an air cooler for cooling air, a dehumidifier for lowering humidity of air, an air cleaner for enhancing cleanness of air.

Among them, the air cooler lowers temperature of a room by a cooling principle based on heat of vaporization. Absorption of heat occurs when liquid is evaporated into gas, and release of heat occurs when gas is condensed into liquid. The heat absorbed for the evaporation is called the heat of vaporization. The air cooler condenses coolant from a gas state into a liquid state by highly changing pressure through a compressor, and evaporates and returns the coolant of the liquid state into vapor by lowering the pressure in an evaporator, so that the vaporized coolant can absorbs heat, thereby lowering ambient temperature. The cooling of the air cooler is performed by a simple cooling cycle capable of efficiently making a lot of heat of vaporization, and such a method is also applied to a refrigerator. Although heat transfers from high temperature to low temperature in a natural phenomenon, the cooling cycle of the air cooler makes heat transfer in an opposite direction from low indoor temperature to high outdoor temperature. To this end, the air cooler includes an indoor unit blowing cold air, and an outdoor unit blowing hot air. In a similar way, the refrigerator makes heat transfer from low temperature inside the refrigerator to high temperature outside the refrigerator.

The outdoor unit and the indoor unit of the air cooler are connected by a plurality of pipes. Through these pipes, a refrigerant circulates from the outdoor unit to the indoor unit and circulates again from the indoor unit to the outdoor unit while changing in phase. During this process, vibration and noise may occur in the pipes according to the states of the circulating refrigerant.

For example, the refrigerant in the outdoor unit becomes high-pressure liquid and then expands as a refrigerant of two-phases where gas and liquid are mixed. The refrigerant of two-phases discharged from the outdoor unit is transferred to the indoor unit through an external connection pipe. In the indoor unit, the refrigerant becomes low-pressure gas. While the refrigerant of two-phases moves through the external connection pipe, a gaseous refrigerant and a liquid refrigerant are different in transfer speed. Therefore, collision occurs between the gaseous refrigerant and the liquid refrigerant.

In many cases, the external connection pipe is previously provided in an installation zone for the air cooler. In these cases, the external connection pipe is often embedded in a floor or wall of a building, and its channel may be curved according to the structures of the building. Further, when the external connection pipe has a relatively large diameter to cope with various products of the air cooler, the outdoor unit and the indoor unit may be different in the diameter of the external connection pipe itself in a coupling region.

Due to such various causes, vibration and noise may occur from the external connection pipe through which the refrigerant is transferred between the outdoor unit and the indoor unit. Accordingly, a method of reducing the vibration and the noise in the external connection pipe by a simple structure is required.

SUMMARY

According to an embodiment of the disclosure of the present disclosure, there is provided an air conditioner including: an outdoor heat exchanger configured to exchange heat between a refrigerant and outdoor air; an indoor heat exchanger configured to exchange heat between the refrigerant and indoor air; a first pipe configured to provide a channel for the refrigerant flowing out of the outdoor heat exchanger and having a first inner diameter; a second pipe configured to provide a channel for the refrigerant flowing into the indoor heat exchanger; a coupling member configured to couple end portions of the first pipe and the second pipe; and a first insertion pipe inserted in the second pipe at the end portion of the second pipe and having a second inner diameter smaller than the first inner diameter of the first pipe.

The first insertion pipe may include: a first section positioned at a front end based on a moving direction of the refrigerant and having the second inner diameter, and a second section positioned at a rear end based on the moving direction of the refrigerant and having a third inner diameter larger than the second inner diameter and smaller than the first inner diameter.

The second section may have a length at least ten times longer than the third inner diameter.

The first insertion pipe may include a head extended in a radial direction of the first insertion pipe in a region where the refrigerant enters the first section and having a diameter larger than the first inner diameter.

The coupling member may include a hole communicating with the second pipe; and a holding end provided on an inner circumference forming the hole and configured to support the head of the first insertion pipe inserted through the hole.

The first insertion pipe may include a groove formed by cutting the head along a lengthwise direction of the first insertion pipe and configured to make the head be elastically transformable toward a center.

The first insertion pipe may include a first region forming an inner circumference thereof, and a second region corresponding to a remaining region except the first pipe, and the first region has strength greater than strength of the second region.

The first region may include a metallic material, and the second region includes a rubber material.

The first insertion pipe may include: a first section positioned at a front end based on the moving direction of the refrigerant and having an inner diameter gradually decreasing up to the second inner diameter along the moving direction of the refrigerant; a second section positioned in a middle based on the moving direction of the refrigerant and having the second inner diameter; and a third section positioned at a rear end based on the moving direction of the refrigerant and having an inner diameter gradually increasing from the second inner diameter along the moving direction of the refrigerant.

The first insertion pipe may include: a first section positioned at a front end based on the moving direction of the refrigerant and having the second inner diameter; and a second section positioned at a rear end based on the moving direction of the refrigerant and having an inner diameter gradually increasing from the second inner diameter along the moving direction of the refrigerant.

The air conditioner may further include a flow control valve configured to control a flowing amount of refrigerant flowing out from the outdoor heat exchanger to the second pipe.

The coupling member may include: a first coupling member joined to an end portion of one between the first pipe and the second pipe and having a screw thread shaped like a bolt; and a second coupling member joined to the other end portion between the first pipe and the second pipe and having a screw thread shaped like a nut corresponding to the screw thread of the first coupling member.

The air conditioner may further include a second insertion pipe inserted in the first pipe at an end portion of the first pipe, being in contact with an end portion of the first insertion pipe, and having an inner diameter smaller than the first inner diameter and larger than the second inner diameter.

The second insertion pipe may have a length at least ten times longer than the inner diameter of the second insertion pipe.

The second insertion pipe may include a partition wall configured to divide a channel inside the second insertion pipe into a plurality of channels.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Below, embodiments will be described in detail with reference to accompanying drawings. Further, the embodiments described with reference to the accompanying drawings are not exclusive to each other unless otherwise mentioned, and a plurality of embodiments may be selectively combined within one apparatus. The combination of these plural embodiments may be discretionally selected and applied to realize the present inventive concept by a person having an ordinary skill in the art.

Below, embodiments will be described in detail with reference to accompanying drawings. Further, the embodiments described with reference to the accompanying drawings are not exclusive to each other unless otherwise mentioned, and a plurality of embodiments may be selectively combined within one apparatus. The combination of these plural embodiments may be discretionally selected and applied to realize the present inventive concept by a person having an ordinary skill in the art.

In the description of the embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the disclosure.

Further, "at least one" among a plurality of elements in the disclosure represents not only all the elements but also each one of the elements, which excludes the other elements or all combinations of the elements.

Figure 1:
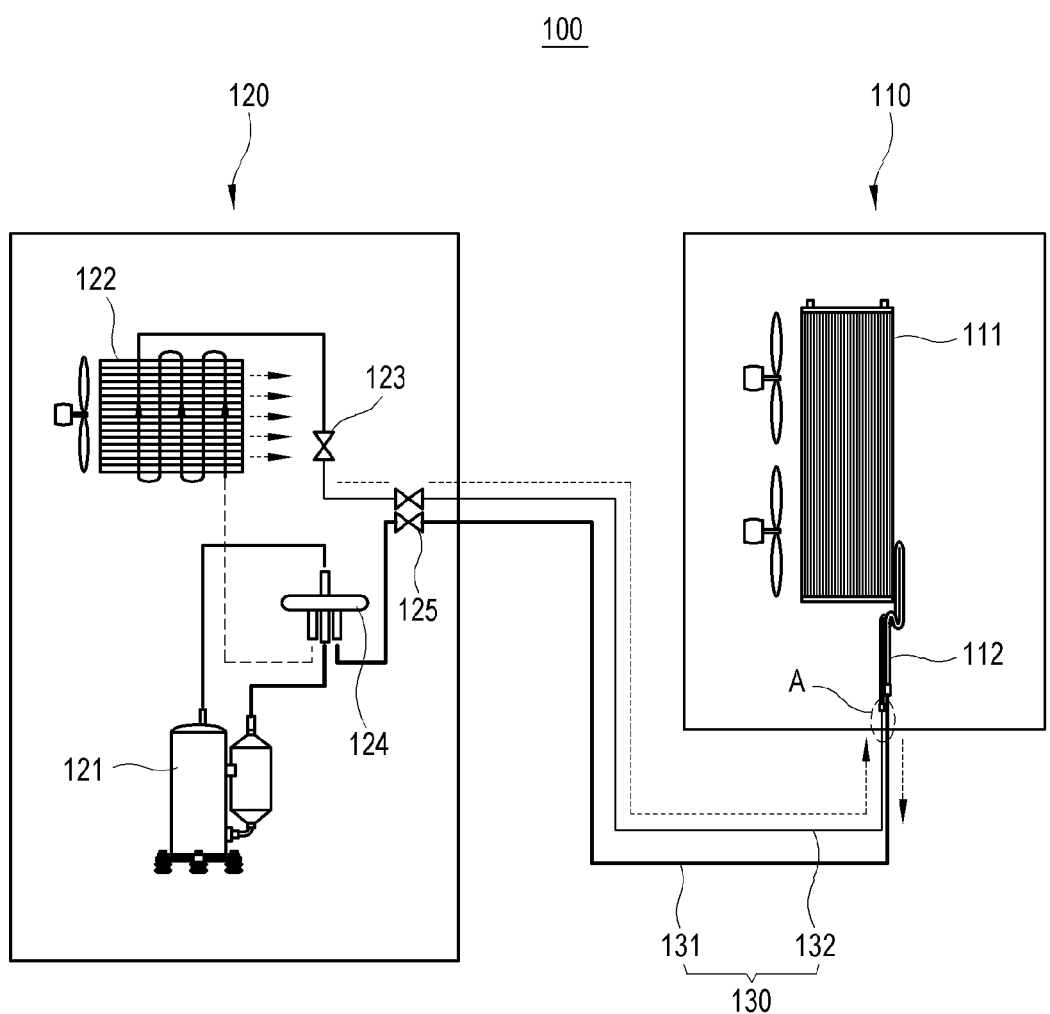
FIG. 1 illustrates a structure of an air cooler according to an embodiment of the disclosure.

FIG. 1 illustrates a structure of an air cooler according to an embodiment of the disclosure.

As shown in FIG. 1, an air conditioner according to an embodiment of the disclosure is actualized by an air cooler. The air cooler 100 includes an indoor unit 110 to be installed in a first place having an environment of which temperature is desired to be controlled like an interior of a building, and an outdoor unit 120 to be installed in a second place free from the foregoing environment like an exterior of the building. A refrigerant or coolant circulates between the indoor unit 110 and the outdoor unit 120, and each of the indoor unit 110 and the outdoor unit 120 adjusts the state of the refrigerant based on energy, thereby controlling the temperature under the foregoing environment. In this embodiment, one indoor unit 110 and one outdoor unit 120 are provided. However, a plurality of indoor units 110 and a plurality of outdoor units 120 may be designed.

The air cooler 100 basically performs cooling based on heat of vaporization. The refrigerant absorbs heat when liquid is evaporated into gas, but releases heat when gas is condensed into liquid. The heat absorbed when the refrigerant is evaporated is called the heat of vaporization. Because the air cooler 100 employs phase change of the refrigerant between liquid and gas, a refrigerant having a low evaporation point and releasing much heat of vaporization may be used in the air cooler 100. Further, the refrigerant is required not to corrode the metal for the pipes because the indoor/outdoor pipes of the air cooler 100 are generally made of metal. In addition, the refrigerant is required to stay in a liquid form even at a low temperature according to use locations because problems arise when the refrigerant is frozen in winter.

To this end, the indoor unit 110 and the outdoor unit 120 have a structure for the phase change and the circulation of the refrigerant as follows.

The indoor unit 110 includes an indoor heat exchanger 111. The outdoor unit 120 includes a compressor 121, an outdoor heat exchanger 122, a flow control valve 123, a four-way valve 124, and a service valve 125. Further, an external pipe 130 is installed to provide a channel through which the refrigerator is transferred between the indoor unit 110 and the outdoor unit 120. The external pipe 130 includes a first external pipe 131 for providing a channel through which the refrigerant flowing out from the indoor unit 110 flows into the outdoor unit 120, and a second external pipe 132 for providing a channel through which the refrigerant flowing out from the outdoor unit 120 flows in the indoor unit 110.

Here, terms "front end" and "rear end" or "front-end portion" and "rear-end portion" are as follows. For a predetermined element, such terms are defined with respect to a moving direction of a refrigerant. For example, when the second external pipe 132 has one end connected to the outdoor unit 120 and the other end connected to the indoor unit 110, the refrigerant in the second external pipe 132 flows from the outdoor unit 120 to the indoor unit 110. Therefore, the front-end portion of the second external pipe 132 indicates the end portion connected to the outdoor unit 120, and the rear-end portion of the second external pipe 132 indicates the end portion connected to the indoor unit 110.

Similarly, the front-end portion of the first external pipe 131 indicates the end portion connected to the indoor unit 110, and the rear-end portion of the first external pipe 131 indicates the end portion connected to the rear-end portion.

The indoor heat exchanger 111 serves as an evaporator when the air cooler 100 is in a cooling mode, and changes the refrigerant to have a low pressure and a gaseous state. When the indoor heat exchanger 111 serves as the evaporator, the refrigerant in the indoor heat exchanger 111 becomes gas by absorbing heat from surrounding environments, and temperature around the indoor heat exchanger 111 is lowered. The refrigerant of the low-pressure gas moves from the indoor unit 110 to the outdoor unit 120 through the first external pipe 131, and is introduced into the compressor 121.

The compressor 121 compresses a gaseous cold refrigerant into high-temperature and high-pressure gas. The reason why the compressor 121 compresses the refrigerant is because phase change into liquid is easy at a high temperature. Further, the compressor 121 receives a low-pressure refrigerant and discharges a high-pressure refrigerant to the outdoor heat exchanger 122, forming a circulation cycle for the refrigerant.

The outdoor heat exchanger 122 serves as a condenser when the air cooler 100 is in the cooling mode, and changes a high-temperature and high-pressure refrigerant into a liquid refrigerant by cooling. In other words, the high-temperature and high-pressure refrigerant flowing out of the compressor 121 performs interaction about heat with air in the outdoor heat exchanger 122, and changes into a middle-temperature and high-pressure refrigerant while radiating heat to the outside. The liquid refrigerant is introduced into the indoor heat exchanger 111 through the second external pipe 132.

The flow control valve 123 refers to a valve for controlling the amount of refrigerant flowing out of the outdoor heat exchanger 122. In this embodiment, the flow control valve 123 does not need to change the pressure of the refrigerant besides the function of controlling the flowing amount of the refrigerant. In other words, the flow control valve 123 may be designed to change the pressure of the refrigerant, but maybe not. When the flow control valve 123 does not change the pressure of the refrigerant, a high-pressure liquid refrigerant flowing out of the outdoor heat exchanger 122 moves along the second external pipe 132 without substantially lowering its pressure while passing through the flow control valve 123.

The four-way valve 124 refers to a value for changing the circulation cycle of the refrigerant. The four-way valve 124 makes the indoor heat exchanger 111 and the outdoor heat exchanger 122 respectively operate as the evaporator and the condenser when the air cooler 100 is the cooling mode, but makes the indoor heat exchanger 111 and the outdoor heat exchanger 122 respectively operate as the condenser and the evaporator when the air cooler 100 is in a heating mode.

The service valve 125 refers to a valve for allowing a manager to control a vacuum state and replenish a refrigerant, in the circulation cycle for the refrigerant involving the external pipe 130.

Meanwhile, with respect to the moving direction of the refrigerant, the rear-end portion of the second external pipe 132 is coupled to the indoor unit 110, in particular, to an entry pipe 112 of the indoor heat exchanger 111. Because the channel of the second external pipe 132 communicates with the channel of the entry pipe 112, the refrigerant moving inside the second external pipe 132 may be introduced into the indoor heat exchanger 111 through the entry pipe 112. Here, the diameter of the second external pipe 132 may be equal to or different from the diameter of the entry pipe 112. In any case, the second external pipe 132 and the entry pipe 112 are airtightly coupled without leakage of a refrigerant.

Below, a coupling structure between the second external pipe 132 and the entry pipe 112 will be described.

Figure 2:
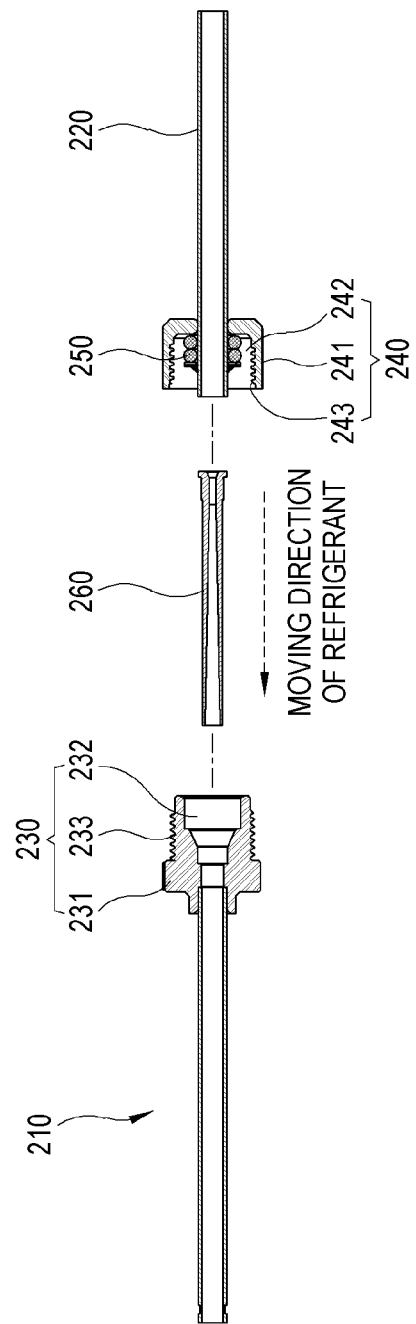
FIG. 2 illustrates a lateral section view partially showing a region A of FIG. 1, in which an entry pipe and an external pipe of an indoor unit are separated.

FIG. 2 illustrates a lateral section view partially showing a region A of FIG. 1, in which an entry pipe and an external pipe of an indoor unit are separated;

As shown in FIG. 2, a front-end portion of an entry pipe 210 of an indoor unit is coupled to a rear-end portion of an external pipe 220. By the coupling between the entry pipe 210 and the external pipe 220, a refrigerant from an outdoor unit can move to the entry pipe 210 through the external pipe 220. For coupling the entry pipe 210 and the external pipe 220, first and second coupling members 230 and 240 are provided.

The first and second coupling members 230 and 240 include a first coupling member 230 coupled to the front-end portion of the entry pipe 210, and a second coupling member 240 corresponding to the shape of the first coupling member 230 and coupled to the rear-end portion of the external pipe 220. When the first coupling member 230 and the entry pipe 210 are separately manufactured, the first coupling member 230 may be coupled to the entry pipe 210 by welding, adhesion, etc. Alternatively, the first coupling member 230 and the entry pipe 210 may be provided as a single body. In such a manner, the second coupling member 240 may be also coupled to the external pipe 220. To facilitate coupling and separation, the second coupling member 240 may not be coupled to the external pipe 220.

The entry pipe 210 and the external pipe 220 include aluminum, copper or the like metallic material. The first and second coupling members 230 and 240 also include one of various metallic materials. In consideration of easy welding, the entry pipe 210 and the first coupling member 230 may include the same metallic material, and the external pipe 220 and the second coupling member 240 may include the same metallic material.

The first coupling member 230 and the second coupling member 240 have corresponding screw-thread structures to be fastened to each other. Alternatively, one of the first coupling member 230 and the second coupling member 240 may have a hook shape, and the other one may have a hook holder to which the hook is coupled. In this embodiment, the first coupling member 230 and the second coupling member 240 have the screw thread structures corresponding to each other. However, various structures may be used for coupling the first coupling member 230 and the second coupling member 240.

The first coupling member 230 includes a first main body 231, a first hole 232 formed inside and passing through the first main body 231, and a first coupling portion 233 formed with a screw thread on the outer circumference of the first main body 231. The front-end portion of the first hole 232 is provided to accommodate the rear-end portion of the external pipe 220, and the rear-end portion of the first hole 232 is provided to accommodate the front-end portion of the entry pipe 210.

The second coupling member 240 includes a second main body 241, a second hole 242 formed inside and passing through the second main body 241, and a second coupling portion 243 formed with a screw thread corresponding to the first coupling portion 233 on the inner circumference of the second main body 241 forming the second hole 242. The second hole 242 is provided to accommodate the front-end portion of the first main body 231 and the external pipe 220. For airtightness, the second hole 242 may accommodate an O-ring 250 surrounding the outer circumference of the external pipe 220.

In other words, the first coupling member 230 is generally shaped like a bolt, and the second coupling member 240 is shaped like a nut corresponding to the bolt. Such a structure makes the first coupling member 230 and the second coupling member 240 be easily coupled and separated.

With this structure, the air cooler according to an embodiment includes an insertion pipe 260 inserted into the entry pipe 210 from the front-end portion of the entry pipe 210 through the first hole 232 and having an inner diameter smaller than the inner diameter of the entry pipe 210. The insertion pipe 260 has effects as follows.

In the foregoing description about the air cooler, the flow control valve according to an embodiment of the disclosure controls the flowing amount of the refrigerator and does not change the pressure of the refrigerant as a valve for controlling the amount of refrigerant flowing out of the outdoor heat exchanger. In other words, the refrigerant discharged from the outdoor unit and moving through the external pipe 220 substantially becomes a high-pressure liquid by the outdoor heat exchanger. When the refrigerant is liquid while moving in the external pipe 220, noise and vibration are reduced as compared with those of when the refrigerant is of two phases where liquid and gas are mixed. Further, the refrigerant has high pressure and thus easily flows while moving in the external pipe 220.

However, the high-pressure liquid refrigerant needs to have a low pressure before entering the indoor unit, in particular, the indoor heat exchanger. When the high-pressure refrigerant is directly introduced into the indoor heat exchanger, the evaporation of the refrigerant is difficult in the indoor heat exchanger.

According to an embodiment, the insertion pipe 260 makes the high-pressure liquid refrigerant introduced in the indoor heat exchanger expand and become a low-pressure refrigerant of two phases. Thus, the insertion pipe 260 makes the evaporation of the refrigerant easy while the refrigerant is vaporized in the indoor heat exchanger. Further, the insertion pipe 260 is so simple that a user can easily install the insertion pipe 260 when the air cooler is installed, and a manufacturer can easily manufacture the insertion pipe 260.

The insertion pipe 260 may be manufactured by various methods, for example, injection molding.

In comparison with an embodiment of the disclosure, the air cooler of the related art does not include the insertion pipe 260 according to an embodiment of the disclosure, and the flow control valve in the outdoor unit is used instead for the expansion of the refrigerant. In this case, the refrigerant moves having a low pressure and two phases in the external pipe, and therefore vibration and noise are relatively much due to a collision between gaseous refrigerant and liquid refrigerant. Further, a turbulent flow may occur due to an irregular collision between the refrigerants of two phases Therefore, the air cooler according to an embodiment employs the insertion pipe 260, and thus solves the problems, caused in the air cooler of the related art, by a simple structure.

Below, it will be described that the first and second coupling members 230 and 240 are coupled in the state that the insertion pipe 260 according to an embodiment is inserted in the entry pipe 210.

Figure 3:
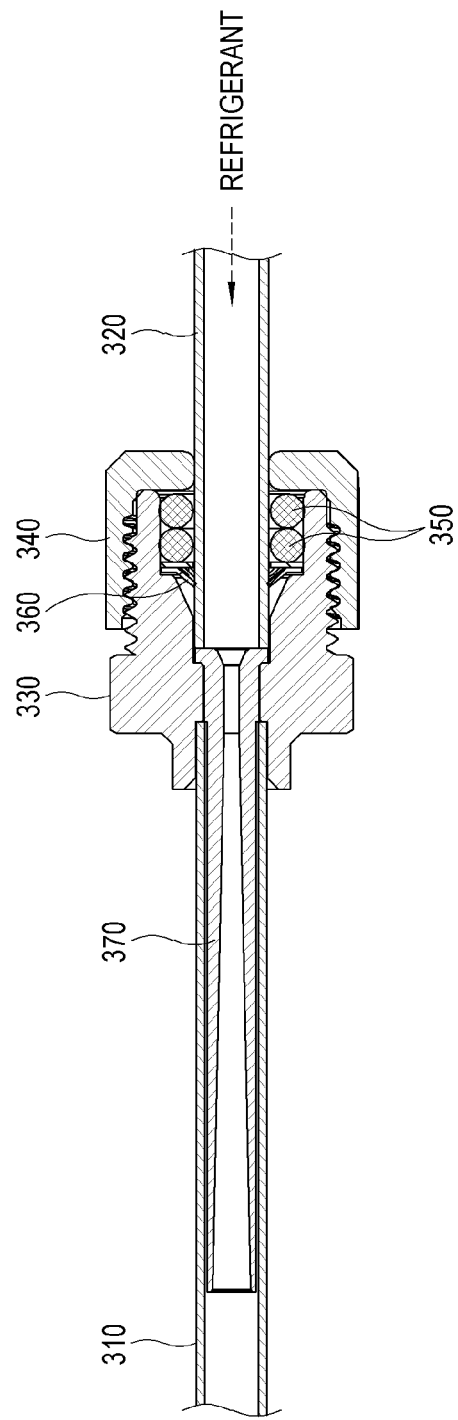
FIG. 3 illustrates a lateral section view partially showing that the external pipe and the entry pipe of the indoor unit of FIG. 2 are coupled.

FIG. 3 illustrates a lateral section view partially showing that the external pipe and the entry pipe of the indoor unit of FIG. 2 are coupled.

As shown in FIG. 3, an entry pipe 310 of the indoor unit and an external pipe 320 are coupled by a first coupling member 330 and a second coupling member 340 fastened to each other. In this case, the first coupling member 330 accommodates the rear-end portion of the external pipe 320, an insertion pipe 370, and the front-end portion of the entry pipe 310. In this state, the second coupling member 340 accommodates the front-end portion of the first coupling member 330, and the first coupling member 330 and the second coupling member 340 are fastened to each other by the screw thread structures formed on the respective contact surfaces thereof.

In a region where the external pipe 320 is accommodated in the first coupling member 330, an O-ring 350 may be arranged to surround the external pipe 320. Alternatively, it may be designed to install a stopper 360 around the external pipe 320 so as to additionally support the O-ring 350 and the external pipe 320.

The insertion pipe 370 is not entirely inserted in but coupled to the entry pipe 310 so that the front-end portion of the insertion pipe 370 can be exposed to the outside of the entry pipe 310. In this case, the insertion pipe 370 can be easily separated from the entry pipe 310 for replacement or repair. Further, the first coupling member 330 and the second coupling member 340 are coupled to make the rear-end portion of the external pipe 320 press the front-end portion of the insertion pipe 370. Thus, it is possible to secure airtightness between the external pipe 320 and the insertion pipe 370, and prevent the refrigerant from external leakage.

Under such a coupling state as shown in FIG. 3, the refrigerant flowing out of the outdoor unit and moving through the external pipe 320 expands while passing through the insertion pipe 370, and the expanded refrigerant moves though the entry pipe 310 and is introduced into the indoor unit.

To separate the insertion pipe 370 from the coupling state, a user unfastens the first coupling member 330 and the second coupling member 340 to thereby separate the second coupling member 340 and the external pipe 320 from the first coupling member 330. Because the front-end portion of the insertion pipe 370 is exposed from the first coupling member 330, it is easy for a user to separate the insertion pipe 370 from the first coupling member 330 and the entry pipe 310.

As shown in FIG. 3, the inner diameter of the insertion pipe 370 inserted in the front-end portion of the entry pipe 310 is smaller than the inner diameter of the entry pipe 310 and the inner diameter of the external pipe 320, and it is thus possible to expand the refrigerant. Such a function of the insertion pipe 370 is based on a throttling effect so called an expansion effect. Below, the throttling effect will be described.

In a pipe, a section where a diameter of a channel becomes relatively smaller will be called a throttling section. In the throttling section where a cross-sectional area is decreased, a speed of a moving fluid becomes faster, and pressure is lowered. In this case, the throttling section involves an endothermic process of absorbing heat from the surroundings as a liquid fluid is vaporized. The throttling effect refers to a phenomenon that a fluid passing through the throttling section is decreased in pressure without exchanging heat quantity and work with the outside. When the fluid is liquid, the pressure is lowered by the throttling. When the pressure is lower than the saturation pressure of the liquid, some liquid is evaporated. Heat needed for the evaporation is got from the liquid itself, and therefore the temperature of the liquid is lowered. In this case, there are no changes in enthalpy between before and after the throttling of the fluid.

In brief, the insertion pipe 370 changes a high-pressure liquid refrigerant into a low-pressure refrigerant of two phases based on the throttling effect.

Below, an internal structure of the insertion pipe 370 will be described in detail.

Figure 4:
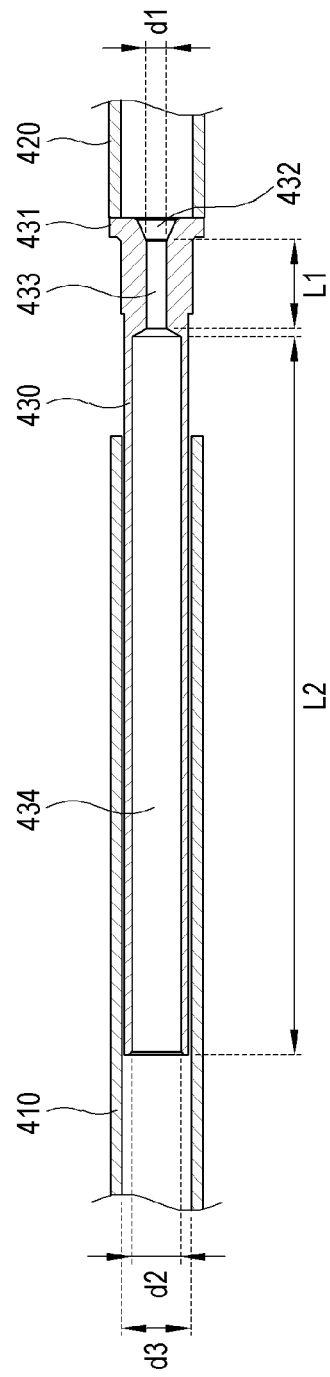
FIG. 4 illustrates a lateral section view partially showing that an insertion pipe is inserted into an entry pipe in an air cooler according to an embodiment of the disclosure.

FIG. 4 illustrates a lateral section view partially showing that the insertion pipe is inserted into the entry pipe in the air cooler according to an embodiment of the disclosure.

As shown in FIG. 4, an insertion pipe 430 is interposed between an entry pipe 410 and an external pipe 420. A structure that the insertion pipe 430 is inserted in the entry pipe 410 is the same as that described in the foregoing embodiment. The rear-end portion of the insertion pipe 430 is inserted in the channel inside the entry pipe 410. A region where the front-end portion of the insertion pipe 430 is in contact with the external pipe 420, i.e. a head 431 is extended in a radial direction of the insertion pipe 430, so that the external pipe 420 can stably press the insertion pipe 430. The diameter of the head 431 is larger than the inner diameter of the entry pipe 410.

Further, the head 431 or the front-end portion of the insertion pipe 430 has a larger outer diameter than the rear-end portion of the insertion pipe 430. Thus, it is possible to prevent the insertion pipe 430 from being entirely put into the channel inside the entry pipe 410.

The channel inside the insertion pipe 430 includes an inlet section 432 formed at an inlet of the front-end portion of the insertion pipe 430, an expansion section 433 formed in the front-end portion of the insertion pipe 430, and an relaxation section 434 formed in the rear-end portion of the insertion pipe 430. However, the insertion pipe 430 may be alternately designed to have only the expansion section 433. When the expansion section 433 has an inner diameter d1, a relaxation section 434 has an inner diameter d2, and an entry pipe 410 has an inner diameter d3, they satisfy 'd1<d2<d3.'

The inlet section 432 refers to a short section formed at the inlet of the insertion pipe 430 to be in contact with the external pipe 420, and has a gradually decreased inner diameter. The inlet section 432 tapers to eliminate a sudden difference in the inner diameter between the external pipe 420 and the expansion section 433, reduces a turbulent flow caused by the difference, and guides the refrigerant flowing out of the external pipe 420 to flow in the expansion section 433.

The expansion section 433 serves to expand the refrigerant. The expansion of the refrigerant is the same as that described in the foregoing embodiment.

The relaxation section 434 serves to relax the flow of the refrigerant expanded in the expansion section 433. When the relaxation section 434 is not present, a stepped section corresponding to the sudden difference in the inner diameter arises between the expansion section 433 having the inner diameter d1 and the entry pipe 410 having the inner diameter d3. Such a stepped section may cause a turbulent flow. To reduce the turbulent flow, the relaxation section 434 may be provided between the expansion section 433 and the entry pipe 410.

When the relaxation section 434 is not present, the turbulent flow occurs for the following reasons. The refrigerant passing through the expansion section 433 having a relatively small inner diameter d1 is decreased in pressure but relatively increased in speed. In this case, when the refrigerant immediately flows out from the expansion section 433 to the entry pipe 410 having the inner diameter d3, a section where the flowing speed of the refrigerant is suddenly decreased arises in the channel of the entry pipe 410 being in contact with the expansion section 433. Regarding such a section, the turbulent flow may occur.

Accordingly, according to an embodiment, a section of gradually decreasing the speed of the refrigerant is sufficiently given by the relaxation section 434 having the inner diameter d2 greater than d1 but smaller than d3, thereby reducing the turbulent flow.

The relaxation section 434 has a length L2 longer than a length L1 of the expansion section 433, and in more detail, 'L2' is at least ten times greater than 'd2.' The reasons are as follows.

On the assumption that a gaseous refrigerant and a liquid refrigerant simultaneously move from a starting point of the channel, the gaseous refrigerant moves ahead of the liquid refrigerant. In other words, the gaseous refrigerant gets farther away from the liquid refrigerant. However, based on fluid mechanics, the gaseous refrigerant and the liquid refrigerant starting at the same position do not get boundlessly away from each other. At a predetermined distance from the starting position, a distance between the gaseous refrigerant and the liquid refrigerant does not change. Data based on many experiments showed that the distance between the gaseous refrigerant and the liquid refrigerant did not change at a distance about ten times greater than the inner diameter of the channel from the starting position. Therefore, 'L2' is at least ten times greater than 'd2.'

Meanwhile, in the foregoing embodiment, the inner diameter of the relaxation section 434 is constant regardless of positions. Alternatively, the inner diameter of the relaxation section 434 may be not constant. In this regard, an embodiment will be described below.

Figure 5:
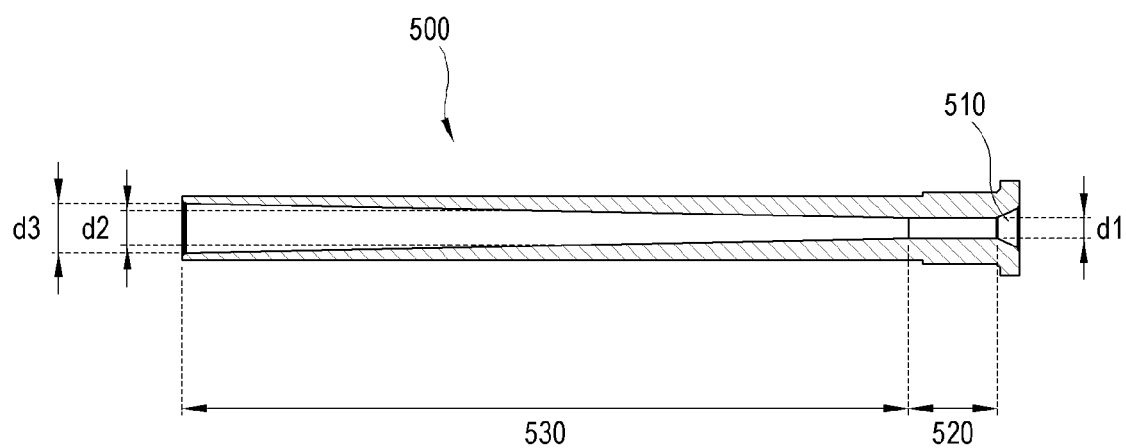
FIG. 5 illustrates a lateral section view partially showing that an insertion pipe has a tapering structure in an air cooler according to an embodiment of the disclosure.

FIG. 5 illustrates a lateral section view partially showing that an insertion pipe has a tapering structure in an air cooler according to an embodiment of the disclosure.

As shown in FIG. 5, an insertion pipe 500 includes an inlet section 510, an expansion section 520, and a relaxation section 530 in sequence from the front-end portion along a moving direction of a refrigerant. Each function of the sections is the same as that described in the foregoing embodiment.

According to this embodiment, the relaxation section 530 is varied in inner diameter depending on positions. For example, the inner diameter d1 at the inlet of the relaxation section 530 being in contact with the expansion section 520 is the same as the inner diameter of the expansion section 520. The inner diameter gradually increases toward the rear-end portion of the relaxation section 530. The inner diameter d2 in the middle of the relaxation section 530 is larger than 'd1, and the inner diameter d3 at the rear-end portion of the relaxation section 530 is larger than 'd2.' In other words, the inner diameter of the relaxation section 530 tapers from the outlet toward the inlet. In this case, the speed of the refrigerant is gradually decreased in the relaxation section 530, thereby having an improved effect on relaxing the flow as compared with that of the foregoing embodiment where the relaxation section 530 has the constant inner diameter regardless of the positions.

In this embodiment, the inner diameter of the relaxation section 530 gradually increases from the inlet toward the outlet. Alternatively, the inner diameter may stepwise increase. For example, the relaxation section 530 may have not a tapering structure but a stepwise structure.

Meanwhile, when the insertion pipe is inserted in the entry pipe and coupled by the coupling unit, various additional designs are possible. In this regard, descriptions will be made below.

Figure 6:
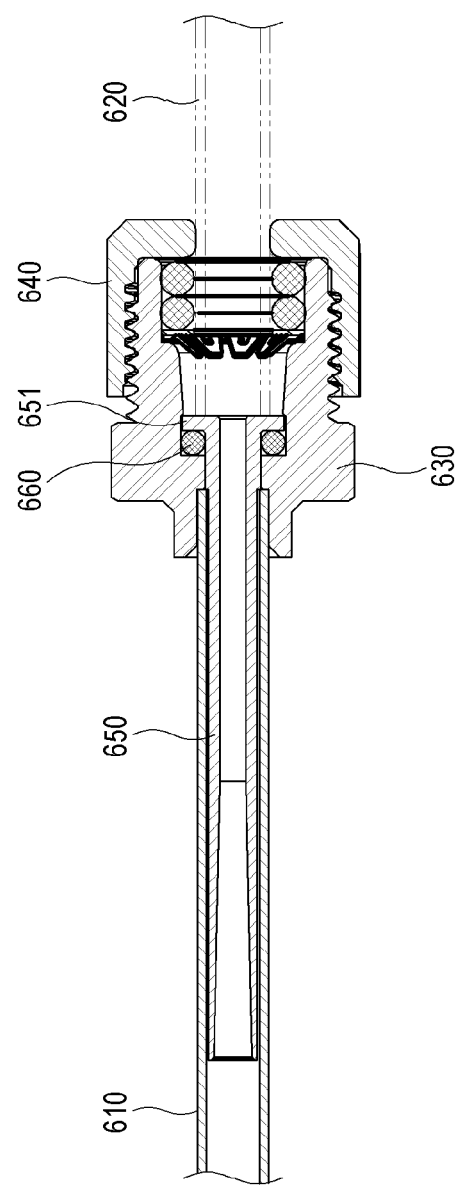
FIG. 6 illustrates a lateral section view partially showing a structure that an entry pipe and an external pipe are coupled by a coupling unit in an air cooler according to an embodiment of the disclosure.

FIG. 6 illustrates a lateral section view partially showing a structure that an entry pipe and an external pipe are coupled by a coupling unit in an air cooler according to an embodiment of the disclosure.

As shown in FIG. 6, an entry pipe 610 and an external pipe 620 are coupled by a first coupling member 630 and a second coupling member 640, and an insertion pipe 650 is inserted in a channel of the entry pipe 610. Descriptions about this structure are substantially the same as those of the foregoing embodiment.

The front-end portion of the insertion pipe 650 is extended by a predetermined length in a direction perpendicular to an axial line of a moving direction of the refrigerant, i.e. in a radial direction of the insertion pipe 650. Such a front-end portion of the insertion pipe 650 will be called a head 651. In FIG. 6, the right side of the head 651 is in contact with the rear-end portion of the external pipe 620, and the left side of the head 651 faces toward the first coupling member 630.

On the contrary to the foregoing embodiment where the left side of the head 651 is in contact with the first coupling member 630, the left side of the head 651 according to this embodiment does not contact the first coupling member 630 and a predetermined space is formed between the head 651 and the first coupling member 630. This space is formed to surround the insertion pipe 650, and configured to accommodate an O-ring 660.

The O-ring 660 accommodated in this space is pressed against the first coupling member 630 by the left side of the head 651. The O-ring 660 is configured to surround the insertion pipe 650, and improves airtightness for the insertion pipe 650.

According to an embodiment, the O-ring 660 may additionally have a structure for preventing separation of the insertion pipe 650 in addition to the structure of being supported by the left side of the head 651. In this regard, descriptions will be made below.

Figure 7:
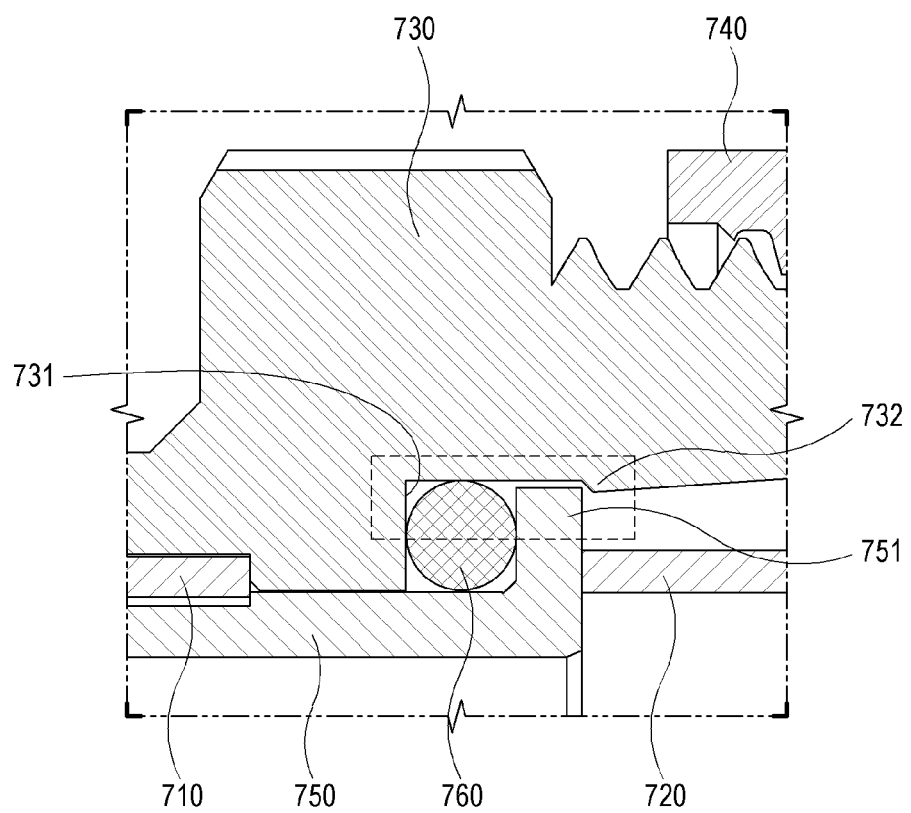
FIG. 7 illustrates a lateral section view partially showing that an insertion pipe is supported by a first coupling member in an air cooler according to an embodiment of the disclosure.

FIG. 7 illustrates a lateral section view partially showing that an insertion pipe is supported by a first coupling member in an air cooler according to an embodiment of the disclosure.

As shown in FIG. 7, an entry pipe 710 and an external pipe 720 are coupled by a first coupling member 730 and a second coupling member 740, and an insertion pipe 750 is inserted in a channel of the entry pipe 710. Descriptions about this structure are substantially the same as those of the foregoing embodiment.

The insertion pipe 750 includes a head 751 extended by a predetermined length in a radial direction of the insertion pipe 750. The first coupling member 730 together with the head 751 forms an accommodating space 731 to accommodate an O-ring 760 therein. The O-ring 760 is accommodated in the accommodating space 731 as interposed between the left side of the head 751 and the first coupling member 730 and keeps airtightness while surrounding the insertion pipe 750. This structure is the same as that described in the foregoing embodiment.

Here, according to an embodiment, a head holding end 732 protrudes from the inner surface of the first coupling member 730 so that a right side of the head 751 can be caught at one side of the accommodating space 731. The head holding end 732 is provided to hold the edge of the head 751 when the insertion pipe 750 is in position as inserted in the entry pipe 710. When a user inserts the insertion pipe 750 in the entry pipe 710 along the moving direction of the refrigerant, the insertion pipe 750 can be inserted to be in position as the head 751 elastically contracts. When the insertion pipe 750 is in position, the head 751 is held at the head holding end 732 so that the insertion pipe 750 can be prevented from separating in an opposite direction to the moving direction of the refrigerant.

Further, according to an embodiment, the head holding end 732 is employed in such a structure that the first coupling member 730 has the accommodating space 731 for accommodating the O-ring 760. However, the head holding end 732 may be alternatively designed to be applied to the first coupling member 730 that does not have the accommodating space 731. In this case, the O-ring 760 is not present, and therefore the left side of the head 751 is in contact with the first coupling member 730 and the edge at the right side of the head 751 is held in the head holding end 732 when the insertion pipe 750 is in position.

In the foregoing embodiment, the O-ring 760 is in contact with the head 751. Alternatively, the O-ring 760 may be spaced apart from the head 751, and such an embodiment will be described below.

Figure 8:
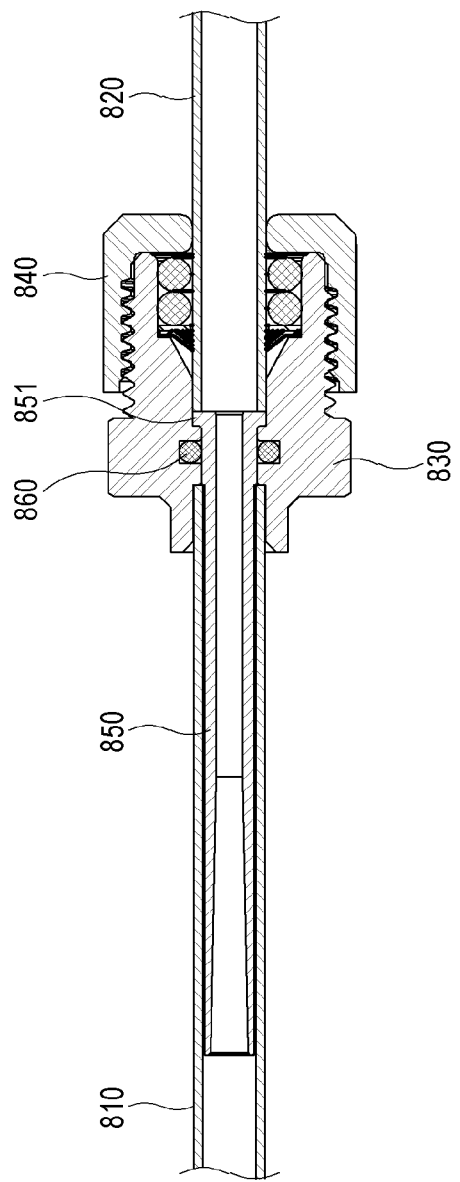
FIG. 8 illustrates a lateral section view partially showing a structure that an O-ring is installed being spaced apart from a head in an air cooler according to an embodiment of the disclosure.

FIG. 8 illustrates a lateral section view partially showing a structure that an O-ring is installed being spaced apart from a head in an air cooler according to an embodiment of the disclosure.

As shown in FIG. 8, an entry pipe 810 and an external pipe 820 are coupled by a first coupling member 830 and a second coupling member 840, and an insertion pipe 850 is inserted in a channel of the entry pipe 810. Descriptions about this structure are substantially the same as those of the foregoing embodiment.

The first coupling member 830 includes a ring-shaped accommodating region in between a head 851 of the insertion pipe 850 and a front-end portion of the entry pipe 810 in a hole through which the insertion pipe 850 passes. In this accommodating region, an O-ring 860 is inserted and accommodated. The O-ring 860 is configured to surround the insertion pipe 850, and contributes to the airtightness of the insertion pipe 850.

The O-ring 860 may be accommodated in the accommodating region of the first coupling member 830 by a user before inserting the insertion pipe 850 in the entry pipe 810. The O-ring 860 is made of an elastic material, inserted in the accommodating region as elastically transformed, and restored to an original state in the accommodating region. Then, a user inserts the insertion pipe 850 in the entry pipe 810.

With such a position and shape, the accommodating region of the first coupling member 830 may be provided to accommodate the O-ring 860 therein according to this embodiment. Alternatively, the accommodating region may insert the head 851 therein according to the shape of the head 851 of the insertion pipe 850, and such an embodiment will be described below.

Figure 9:
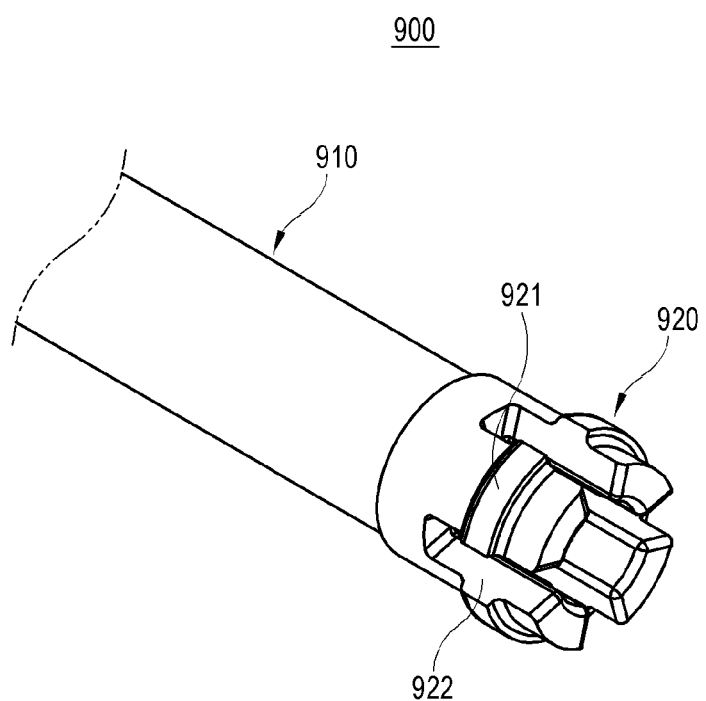
FIG. 9 illustrates a perspective view partially showing a head of an insertion pipe in an air cooler according to an embodiment of the disclosure.

FIG. 9 illustrates a perspective view partially showing a head of an insertion pipe in an air cooler according to an embodiment of the disclosure As shown in FIG. 9, an insertion pipe 900 includes a main body 910 inserted in an entry pipe, and a head 920 having a diameter larger than the diameter of the main body 910 so as to prevent the insertion pipe 900 from being entirely put into the entry pipe. The head 920 includes a holding portion 921 provided on an outer circumference of the insertion pipe 900 and protruding from the insertion pipe 900 in a radial direction, and one or more grooves 922 recessed from the inlet of the head 920 toward the main body 910 in a lengthwise direction of the insertion pipe 900.

The holding portion 921 may have various shapes, for example, a circular shape with respect to an axial line in the lengthwise direction of the insertion pipe 900. The diameter of the holding portion 921 is greater than the diameter of the other region of the head 920 than the holding portion 921.

The groove 922 is recessed from the inlet of the head 920 up to a position across a region in which at least the holding portion 921 is positioned. The depth of the groove 922 starting from the inlet of the head 920 is longer than a distance between the inlet of the head 920 and the position of the holding portion 921. In other words, the groove 922 has a structure to be arranged between a plurality of holding portions 921. When a user presses the center of the head 920, the front-end portion of the head 920 including the holding portion 921 is elastically transformable toward the center due to a space formed by the groove 922. In such a state that the head 920 is elastically transformed, a user can insert the insertion pipe 900 into the entry pipe.

Below, it will be described that the insertion pipe 900 is inserted in the entry pipe.

Figure 10:
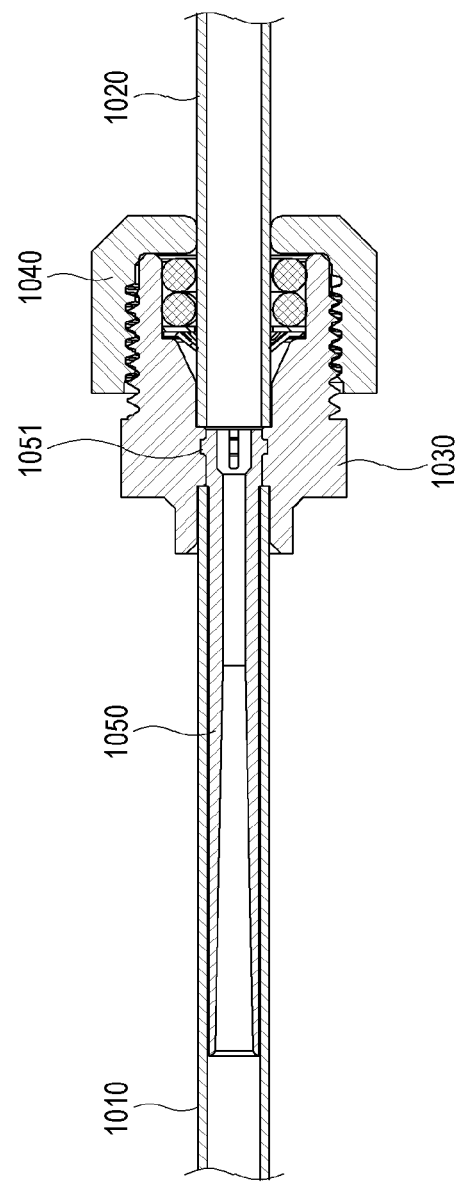
FIG. 10 illustrates a lateral section view partially showing a structure that the insertion pipe of FIG. 9 is mounted to the entry pipe in an air cooler according to an embodiment of the disclosure.

FIG. 10 illustrates a lateral section view partially showing a structure that the insertion pipe of FIG. 9 is mounted to the entry pipe in an air cooler according to an embodiment of the disclosure.

As shown in FIG. 10, an entry pipe 1010 and an external pipe 1020 are coupled by a first coupling member 1030 and a second coupling member 1040, and an insertion pipe 1050 is inserted in a channel of the entry pipe 1010. Descriptions about this structure are substantially the same as those of the foregoing embodiment.

The first coupling member 1030 internally has a hole to insert the insertion pipe 1050 in the entry pipe 1010. A certain region of the hole, in particular, a region between the rear-end portion of the external pipe 1020 and the front-end portion of the entry pipe 1010 forms a groove, and this groove is provided corresponding to the shape of a holding portion 1051 of the insertion pipe 1050. A structure about the holding portion 1051 of the insertion pipe 1050 is the same as that described above with reference to the previous drawing.

A user presses the head of the insertion pipe 1050 toward the center of the insertion pipe 1050 so that the diameter of the head of the insertion pipe 1050 can elastically contract. In this state, the insertion pipe 1050 is inserted in the entry pipe 1010 through the hole inside the first coupling member 1030. When the insertion pipe 1050 is in position as inserted in the entry pipe 1010 and a user releases an external force from the head of the insertion pipe 1050, the holding portion 1051 is fitted to the corresponding groove of the first coupling member 1030. As the holding portion 1051 is held in the groove, the insertion pipe 1050 is prevented from separating toward the outside of the first coupling member 1030, i.e. in a direction opposite to the moving direction of the refrigerant.

When the first coupling member 1030 and the second coupling member 1040 are coupled, the rear-end portion of the external pipe 1020 presses the head of the insertion pipe 1050 toward the entry pipe 1010. Further, the head of the insertion pipe 1050 is not even but has a protrusion based on the holding portion 1051, and thus the holding portion 1051 contributes to the whole airtightness.

Meanwhile, in the foregoing embodiments, the insertion pipe is uniformly made of a certain material throughout the regions. Alternatively, the insertion pipe may be varied in material depending on the regions, and such an embodiment will be described below.

Figure 11:
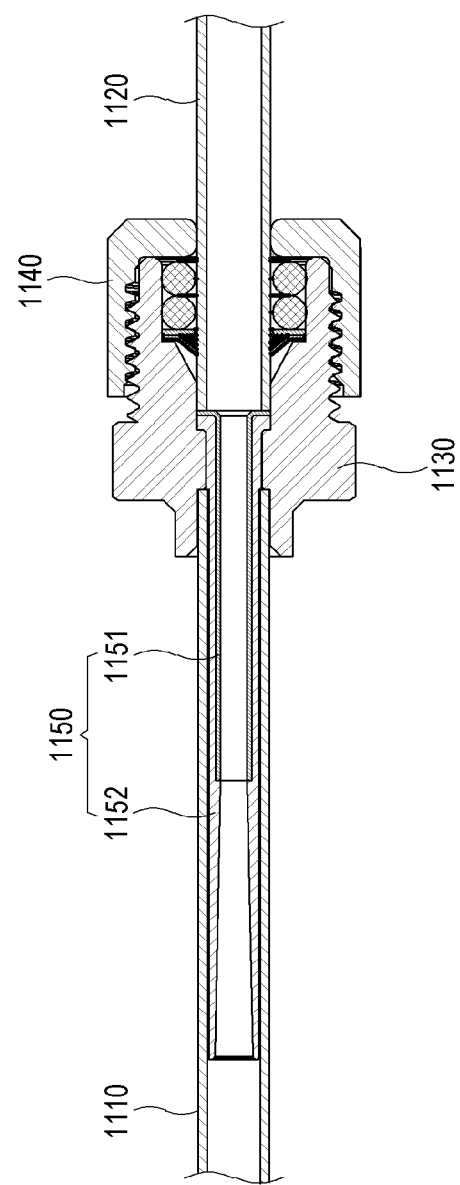
FIG. 11 illustrates a lateral section view partially showing that an insertion pipe is varied in material depending on regions in an air cooler according to an embodiment of the disclosure.

FIG. 11 illustrates a lateral section view partially showing that an insertion pipe is varied in material depending on regions in an air cooler according to an embodiment of the disclosure.

As shown in FIG. 11, an entry pipe 1110 and an external pipe 1120 are coupled by a first coupling member 1130 and a second coupling member 1140, and an insertion pipe 1150 is inserted in a channel of the entry pipe 1110. Descriptions about this structure are substantially the same as those of the foregoing embodiment.

In the whole structure of the insertion pipe 1150, an important part related to performance is an inner diameter corresponding to an inner surface forming a channel. As described above, the inner diameter of the insertion pipe 1150 is precisely managed to effectively make the expansion of the refrigerant. To this end, a first region 1151 forming the inner surface among the whole regions of the insertion pipe 1150 includes a relatively strong material, and the other second region 1152 includes a relatively weak material. For example, the first region 1151 may be made of metal, and the second region 1152 may be made of rubber. Alternatively, the first region 1151 may include a relatively strong metallic material, and the second region 1152 may include a relatively weak metallic material.

The first region 1151 and the second region 1152 may be joined by various methods such as adhesion using an adhesive. Alternatively, the first region 1151 may be formed by applying surface treatment for enhancing strength to the second region 1152. By any method, the first region 1151 is manufactured to be stronger than the second region 1152, thereby securing the precise expansion performance of the insertion pipe 1150.

The first region 1151 may form the entire inner surface of the insertion pipe 1150 forming the channel. Alternatively, the first region 1151 may form the front-end portion in the channel of the insertion pipe 1150, i.e. the entire inlet section and the entire expansion section, and the front-end portion of the relaxation section. In other words, the first region 1151 includes a section, in which the speed of the refrigerant is relatively fast based on the expansion, within the channel of the insertion pipe 1150. In the rear-end portion of the relaxation section, an effect on relaxing the flow is reflected in the refrigerant, and therefore the first region 1151 may not include the rear-end portion of the relaxation section.

Further, the first region 1151 in the insertion pipe 1150 may include a head to be in contact with the external pipe 1120. Because a head portion corresponds to a region to be pressed against the external pipe 1120 for the purpose of airtightness, the strength of this portion has to be secured.

The second region 1152 may include a metallic material, but may include a material for absorbing vibration and noise like rubber to dampen the vibration and reduce the noise.

Meanwhile, in the foregoing embodiment, the insertion pipe has a structure including the expansion section for expanding the refrigerant and the relaxation section for relaxing the flow of the refrigerant. However, the structure of the insertion pipe is not limited to this embodiment but may additionally include a rectifying section for rectifying the refrigerant, and such an embodiment will be described below.

Figure 12:
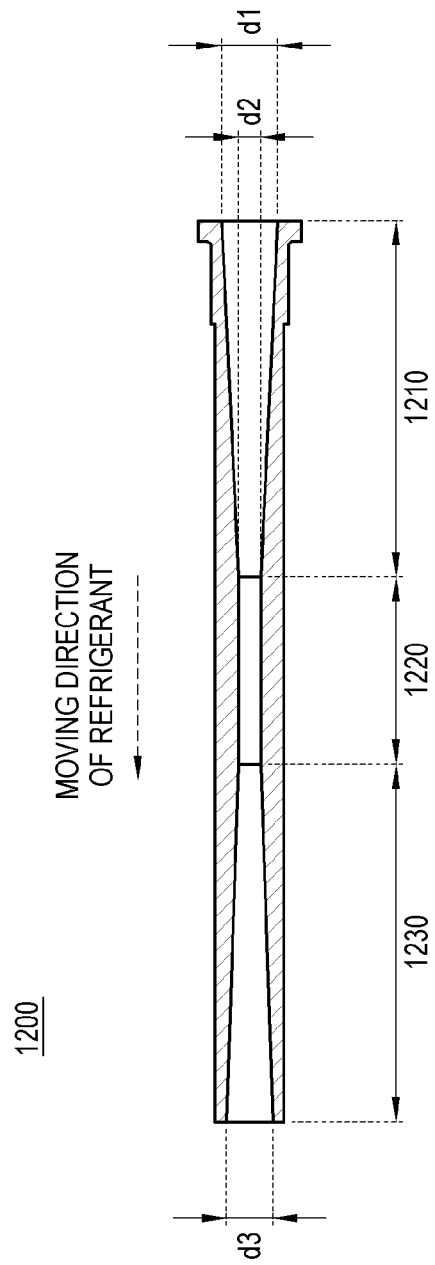
FIG. 12 illustrates a lateral section view showing that an insertion pipe additionally includes a rectifying section in an air cooler according to an embodiment of the disclosure.

FIG. 12 illustrates a lateral section view showing that an insertion pipe additionally includes a rectifying section in an air cooler according to an embodiment of the disclosure.

As shown in FIG. 12, an insertion pipe 1200 according to this embodiment includes a rectifying section 1210, an expansion section 1220, and a relaxation section 1230 in sequence along a moving direction of a refrigerant. In the foregoing embodiment, the insertion pipe includes the expansion section and the relaxation section. According to this embodiment, the insertion pipe 1200 additionally includes a rectifying section 1210 at the front end of the expansion section. The functions of the expansion section 1220 and the relaxation section 1230 are the same as those described in the foregoing embodiment.

An inner diameter d1 at an inlet of the rectifying section 1210 is greater than the inner diameter d2 of the expansion section 1220, and the inner diameter of the rectifying section 1210 decreases as it gets closer to the expansion section 1220. In other words, the channel inside the rectifying section 1210 becomes narrower as it gets closer to the expansion section 1220. Meanwhile, an inner diameter d3 at an outlet of the relaxation section 1230 is greater than the inner diameter d2 of the expansion section 1220, and the inner diameter of the relaxation section 1230 increases as it gets farther away from the expansion section 1220. In other words, the rectifying section 1210 and the relaxation section 1230 schematically symmetrically taper toward the expansion section 1220.

The rectifying section 1210 serves to rectify the refrigerant. In other words, the rectifying section 1210 is configured to reduce flow resistance before the high-pressure refrigerant enters the expansion section 1220. In the foregoing embodiment, the inlet section of the insertion pipe also has a tapering shape, and has a structure similar to the rectifying section 1210 according to this embodiment. However, the rectifying section 1210 is longer than at least the inlet section, thereby substantially enhancing a rectifying function. The length of the rectifying section 1210 is variable depending on various factors. For example, the length of the rectifying section 1210 may be similar to that of the relaxation section 1230.

The rectifying section 1210 is more useful when the flowing amount of the refrigerant is relatively insufficient. When the liquid refrigerant moving in the external pipe is insufficient as compared to a normal flowing amount, a region occupied by air increases inside the external pipe. In this state, the turbulent flow and the noise are highly likely to occur as compared with a state that the liquid refrigerant is fully filled in the channel. In the rectifying section 1210, the inner diameter of the channel gradually decreases, and therefore the region occupied by air inside the channel is decreased.

In this embodiment, the insertion pipe additionally includes the rectifying section. However, the insertion pipe may not include the rectifying section, and a separate element may be used for performing the rectifying function. Such an embodiment will be described below.

Figure 13:
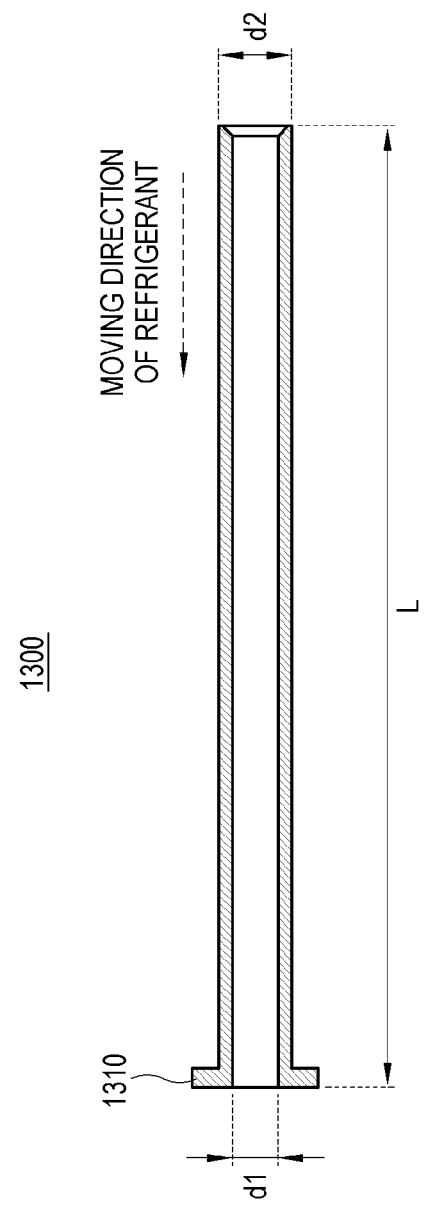
FIG. 13 illustrates a lateral section view showing that a rectifying pipe used in an air cooler according to an embodiment of the disclosure.

FIG. 13 illustrates a lateral section view showing that a rectifying pipe used in an air cooler according to an embodiment of the disclosure.

As shown in FIG. 13, a rectifying pipe 1300 is actualized by a pipe internally having a channel. In this embodiment, the rectifying pipe 1300 has a structure that the inner diameter is not changed in the moving direction of the refrigerant, i.e. the channel has a constant cross-section. However, the rectifying pipe 1300 may be alternately designed to have a tapering structure that the inner diameter gradually decreases in the moving direction of the refrigerant, i.e. that the cross-section of the channel gradually decreases.

The rectifying pipe 1300 is inserted in the external pipe at the rear-end portion of the external pipe, thereby performing a function of rectifying the refrigerant. The rectifying function of the refrigerant is the same as that described in the foregoing embodiment. The installation position of the rectifying pipe 1300 will be described later.

The rectifying pipe 1300 has a structure for being inserted in the pipe like the insertion pipe of the foregoing embodiment. The insertion pipe in the foregoing embodiment may be called a first insertion pipe, and the rectifying pipe 1300 may be called a second insertion pipe. However, in this embodiment, terms such as the insertion pipe and the rectifying pipe 1300 will be used for a clear distinction.

The rectifying pipe 1300 includes a fin 1310 extended by a predetermined distance in a radial direction of the rectifying pipe 1300 in the rear-end portion. The fin 1310 serves to be caught at the outlet of the external pipe so that the rectifying pipe 1300 cannot be entirely put in the external pipe. The fin 1310 has a diameter larger than the inner diameter of the external pipe.

When the rectifying pipe 1300 has a length of L, the rectifying pipe 1300 has an inner diameter of d1, and the rectifying pipe 1300 has an outer diameter of d2, L is at least ten times longer than d1. Further, d1 is greater than the inner diameter of the expansion section of the insertion pipe, and d2 is smaller than the inner diameter of the external pipe.

Below, it will be described that the rectifying pipe 1300 is inserted in the external pipe.

Figure 14:
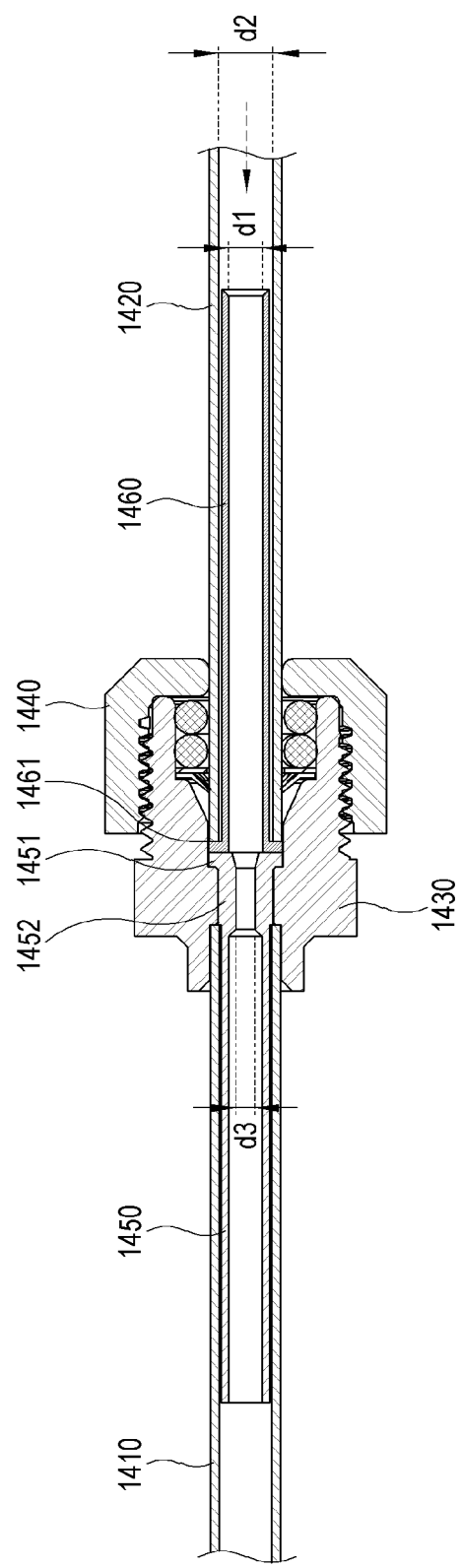
FIG. 14 illustrates a lateral section view partially showing that the rectifying pipe of FIG. 13 is in contact with the insertion pipe as inserted in the external pipe in the air cooler according to an embodiment of the disclosure.

FIG. 14 illustrates a lateral section view partially showing that the rectifying pipe of FIG. 13 is in contact with the insertion pipe as inserted in the external pipe in the air cooler according to an embodiment of the disclosure;

As shown in FIG. 14, an entry pipe 1410 and an external pipe 1420 are coupled by a first coupling member 1430 and a second coupling member 1440, and an insertion pipe 1450 is inserted in a channel of the entry pipe 1410. Descriptions about this structure are substantially the same as those of the foregoing embodiment.

A rectifying pipe 1460 is disposed at the rear-end portion of the external pipe 1420 so as to be positioned at the front end of the insertion pipe 1450. The rectifying pipe 1460 is inserted in the channel of the external pipe 1420, so that the refrigerant flowing out of the external pipe 1420 can be introduced into the insertion pipe 1450 via the rectifying pipe 1460. The inner diameter d1 of the rectifying pipe 1460 is smaller than the inner diameter d2 of the external pipe 1420, and greater than the inner diameter d3 of an expansion section 1452 of the insertion pipe 1450. Thus, the refrigerant passing through the rectifying pipe 1460 is rectified and then introduced into the expansion section 1452.

A head 1451 of the insertion pipe 1450 and a fin 1461 of the rectifying pipe 1460 are extended in parallel and contact with each other. When the first coupling member 1430 and the second coupling member 1440 are coupled, the right side of the fin 1461 in FIG. 14 is in contact with the rear-end portion of the external pipe 1420 and the left side of the fin 1461 is in contact with the head 1451. By surface contact between the fin 1461 and the head 1451, it is possible to improve the whole airtightness.

The high-pressure refrigerant passing through the channel of the external pipe 1420 is rectified while passing through the channel of the rectifying pipe 1460 having a relatively narrow cross-section. Next, the rectified refrigerant is expanded while passing through the expansion section 1452. Detailed descriptions about the rectification and the expansion will be omitted because they are equivalent to those of the foregoing embodiment.

Thus, according to this embodiment, the rectifying pipe 1460 is additionally installed at the front end of the insertion pipe 1450, thereby rectifying the refrigerant before the expansion.

Meanwhile, this embodiment shows that the rectifying pipe has a single channel. However, the rectifying pipe may be alternatively designed to have a plurality of channels. Such an embodiment will be described below.

Figure 15:
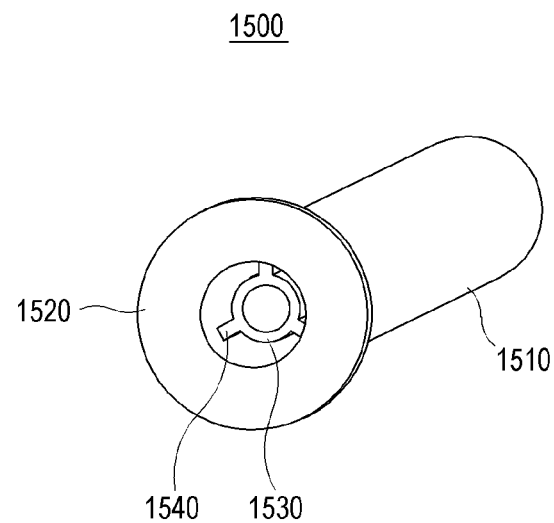
FIG. 15 illustrates a perspective view showing a partition-wall structure of a rectifying pipe in an air cooler according to an embodiment of the disclosure.

FIG. 15 illustrates a perspective view showing a partition-wall structure of a rectifying pipe in an air cooler according to an embodiment of the disclosure.

As shown in FIG. 15, a rectifying pipe 1500 according to this embodiment includes a main body 1510 internally formed with a channel, a fin 1520 extended from the rear-end portion of the main body 1510 in a radial direction of the main body 1510, and a partition wall 1530 for dividing the channel inside the main body 1510 into a plurality of channels. According to this embodiment, the partition wall 1530 is shaped like a pipe with respect to an axial line in the lengthwise direction of the main body 1510. The partition wall 1530 partitions the channel inside the main body 1510 into a first channel inside the partition wall 1530 and a second channel outside the partition wall 1530. The rectifying pipe 1500 may further include a supporting member 1540 protruding from the inner surface of the main body 1510 and supporting the outer circumference of the partition wall 1530.

However, the partition wall 1530 according to this embodiment merely one example among many possible structures. For example, the partition wall 1530 may divide the channel having a circular cross-section in half. Further, the channel may be divided by the partition wall 1530 into two or more channels.

When the channel inside the rectifying pipe 1500 is divided into a plurality of channels by the partition wall 1530, a rectifying effect on the refrigerant may be improved as compared with a case that the partition wall 1530 is not present.

Below, it will be described that the rectifying pipe 1500 is coupled to the external pipe.

Figure 16:
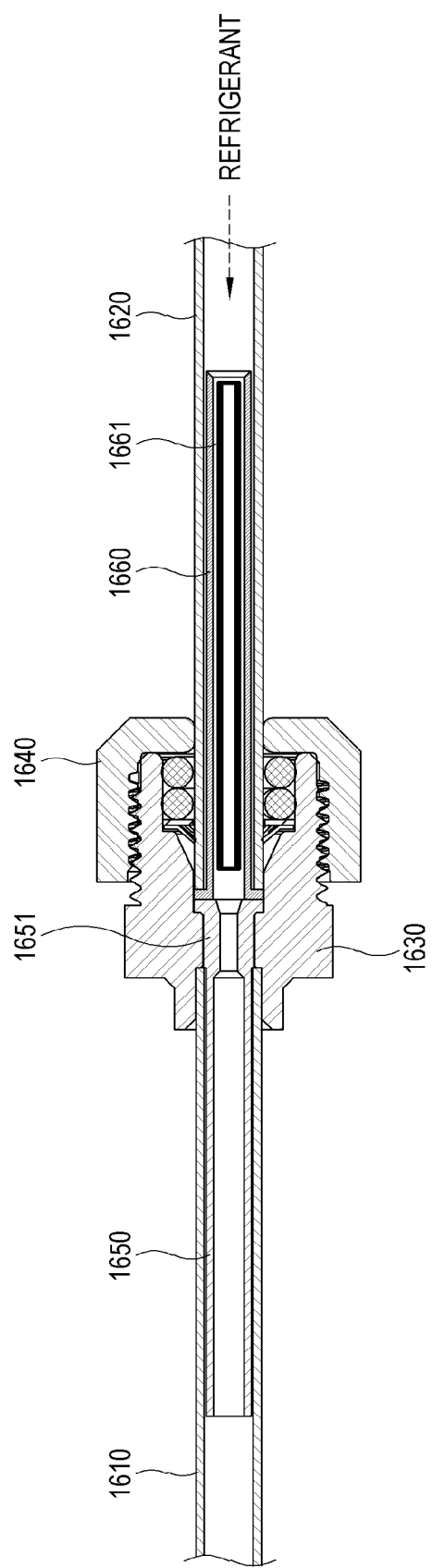
FIG. 16 illustrates a lateral section view partially showing that a rectifying pipe is inserted in an external pipe in an air cooler according to an embodiment of the disclosure.

FIG. 16 illustrates a lateral section view partially showing that a rectifying pipe is inserted in an external pipe in an air cooler according to an embodiment of the disclosure.

As shown in FIG. 16, an entry pipe 1610 and an external pipe 1620 are coupled by a first coupling member 1630 and a second coupling member 1640, and an insertion pipe 1650 is inserted in a channel of the entry pipe 1610. Descriptions about this structure are substantially the same as those of the foregoing embodiment.

A rectifying pipe 1660 is inserted in the external pipe 1620, so that the refrigerant moving in the external pipe 1620 can be introduced into an expansion section 1651 of the insertion pipe 1650 through the rectifying pipe 1660. The rectifying pipe 1660 is installed by substantially the same method as the rectifying pipe of the foregoing embodiment.

The rectifying pipe 1660 includes a channel formed along the moving direction of the refrigerant and divided by a partition wall 1661 into a first channel inside the partition wall 1661 and a second channel outside the partition wall 1661. The partition wall 1661 makes the plurality of channels having a smaller cross-section area than the external pipe 1620, thereby improving a rectifying effect. Further, the partition wall 1661 increases a friction surface with regard to a refrigerant passing therethrough, thereby reducing speed of a high-pressure refrigerant.

Inside the rectifying pipe 1660 with the foregoing structure, a liquid refrigerant moving in the first channel is biased toward the inner circumference of the partition wall 1661 rather than the center region of the partition wall 1661, and the liquid refrigerant moving in the second channel is biased toward the inner circumference of the rectifying pipe 1660. Therefore, friction occurs on the inner circumference of the partition wall 1661 and the inner circumference of the rectifying pipe 1660.

Further, the rectifying pipe 1660 includes the plurality of channels having an inner diameter smaller than the inner diameter of the external pipe 1620, and therefore it is possible to decrease a region occupied by air in the rectifying pipe 1660 when the liquid refrigerant flows together with air.

Like this, the rectifying pipe 1660 according to this embodiment internally includes the partition wall 1661 for partitioning the channel, thereby improving a rectifying function and reducing turbulent flow.

Although the present disclosure has been described with various embodiments, various changes and modifications may be suggested to one skilled in the art. It is intended that the present disclosure encompass such changes and modifications as fall within the scope of the appended claims.

What is claimed is:

1. An air conditioner comprising:
an outdoor heat exchanger configured to exchange heat between a refrigerant and outdoor air;
an indoor heat exchanger configured to exchange heat between the refrigerant and indoor air;
a first pipe configured to provide a channel for the refrigerant flowing out of the outdoor heat exchanger, the first pipe including a first inner diameter;
a second pipe configured to provide a channel for the refrigerant flowing into the indoor heat exchanger;
a coupling member configured to couple an end portion of the first pipe and an end portion of the second pipe; and
a first insertion pipe inserted in the second pipe at the end portion of the second pipe, wherein the first insertion pipe comprises a first section having a first length and a second section having a second length, the first length shorter than the second length, and the first section and the second section being sequentially located along a flowing direction of the refrigerant,
wherein the first section has a second inner diameter which is constant and smaller than the first inner diameter of the first pipe,
wherein the second section has an inner diameter that gradually increases from the second inner diameter at a first end of the second section to a third inner diameter at a second end of the second section, the third inner diameter less than the first inner diameter,
wherein the first insertion pipe comprises:
the first section positioned at a front end based on a moving direction of the refrigerant, the first section including the second inner diameter, and
the second section positioned at a rear end based on the moving direction of the refrigerant, and
wherein the second section includes a length that is at least ten times longer than the third inner diameter.

2. The air conditioner of claim 1, wherein the first insertion pipe comprises a head extended in a radial direction of the first insertion pipe in a region where the refrigerant enters the first section and includes a fourth diameter larger than the first inner diameter.

3. The air conditioner of claim 2, wherein the coupling member comprises:
a hole configured to accommodate the second pipe; and
a holding end provided on an inner circumference forming the hole and configured to support the head of the first insertion pipe when the head of the first insertion pipe is inserted through the hole.

4. The air conditioner of claim 3, wherein:
the first insertion pipe comprises a groove formed by cutting the head along a lengthwise direction of the first insertion pipe; and
the groove is configured to make the head be elastically transformable toward a center.

5. The air conditioner of claim 1, wherein the first insertion pipe comprises:
the first section positioned at the front end of the first insertion pipe based on the moving direction of the refrigerant, the first section including an inner diameter gradually decreasing to the second inner diameter along the moving direction of the refrigerant;
a third section positioned in a middle of the first insertion pipe based on the moving direction of the refrigerant, the second section including the second inner diameter; and
the second section positioned at a rear end of the first insertion pipe based on the moving direction of the refrigerant, the inner diameter gradually increasing from the second inner diameter along the moving direction of the refrigerant.

6. The air conditioner of claim 1, wherein the first insertion pipe comprises:
the first section positioned at the front end of the first insertion pipe based on the moving direction of the refrigerant, the first section including the second inner diameter; and
the second section positioned at a rear end of the first insertion pipe based on the moving direction of the refrigerant, the second section including an inner diameter gradually increasing from the second inner diameter along the moving direction of the refrigerant.

7. The air conditioner of claim 1, further comprising a flow control valve configured to control an amount of refrigerant flowing out from the outdoor heat exchanger to the second pipe.

8. The air conditioner of claim 1, wherein the coupling member comprises:
a first coupling member joined to an end portion of one of the first pipe or the second pipe, the first coupling member including a screw thread shaped like a bolt; and
a second coupling member joined to another end portion of the first pipe or the second pipe, the second coupling member including a screw thread shaped like a nut corresponding to the screw thread of the first coupling member.

9. An air conditioner comprising:
an outdoor heat exchanger configured to exchange heat between a refrigerant and outdoor air;
an indoor heat exchanger configured to exchange heat between the refrigerant and indoor air;
a first pipe configured to provide a channel for the refrigerant flowing out of the outdoor heat exchanger, the first pipe including a first inner diameter;
a second pipe configured to provide a channel for the refrigerant flowing into the indoor heat exchanger;
a coupling member configured to couple an end portion of the first pipe and an end portion of the second pipe; and
a first insertion pipe inserted in the second pipe at the end portion of the second pipe, wherein the first insertion pipe comprises a first section having a first length and a second section having a second length, the first length shorter than the second length, and the first section and the second section being sequentially located along a flowing direction of the refrigerant,
wherein the first section has a second inner diameter which is constant and smaller than the first inner diameter of the first pipe,
wherein the second section has an inner diameter that gradually increases from the second inner diameter at a first end of the second section to a third inner diameter at a second end of the second section, the third inner diameter less than the first inner diameter, and
wherein the first insertion pipe comprises:
a first region forming an inner circumference thereof, and
a second region corresponding to a remaining region except the first region, and
the first region includes a strength that is greater than a strength of the second region.

10. The air conditioner of claim 9, wherein:
the first region comprises a metallic material; and
the second region comprises a rubber material.

11. AN air conditioner comprising:
an outdoor heat exchanger configured to exchange heat between a refrigerant and outdoor air;
an indoor heat exchanger configured to exchange heat between the refrigerant and indoor air;
a first pipe configured to provide a channel for the refrigerant flowing out of the outdoor heat exchanger, the first pipe including a first inner diameter;
a second pipe configured to provide a channel for the refrigerant flowing into the indoor heat exchanger;
a coupling member configured to couple an end portion of the first pipe and an end portion of the second pipe;
a first insertion pipe inserted in the second pipe at the end portion of the second pipe, wherein the first insertion pipe comprises a first section having a first length and a second section having a second length, the first length shorter than the second length, and the first section and the second section being sequentially located along a flowing direction of the refrigerant, wherein the first section has a second inner diameter which is constant and smaller than the first inner diameter of the first pipe, wherein the second section has an inner diameter that gradually increases from the second inner diameter at a first end of the second section to a third inner diameter at a second end of the second section, the third inner diameter less than the first inner diameter; and
a second insertion pipe that is inserted in the first pipe at an end portion of the first pipe and in contact with an end portion of the first insertion pipe, the second insertion pipe including an inner diameter smaller than the first inner diameter and larger than the second inner diameter.

12. The air conditioner of claim 11, wherein the second insertion pipe includes a length that is at least ten times longer than the inner diameter of the second insertion pipe.

13. The air conditioner of claim 11, wherein the second insertion pipe comprises a partition wall configured to divide a channel inside the second insertion pipe into a plurality of channels.

* * * * *